May 3, 1966  H. A. ODLE  3,249,752
GLARE REDUCING REFRACTOR
Filed Oct. 24, 1963  3 Sheets-Sheet 1

INVENTOR.
HERBERT A. ODLE
BY
Nolte & Nolte
ATTORNEYS

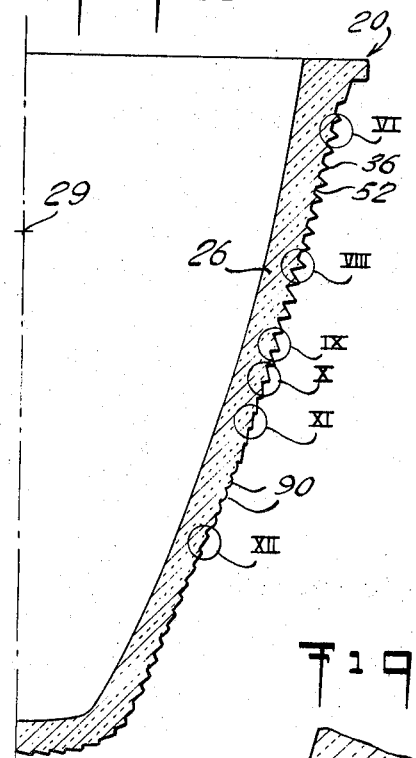
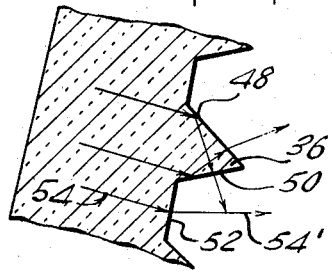
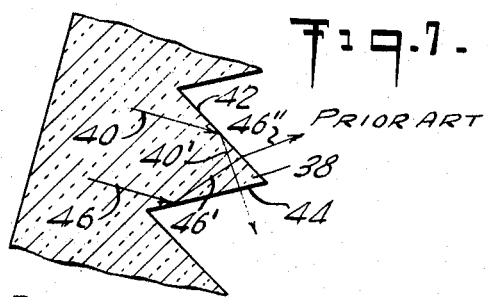
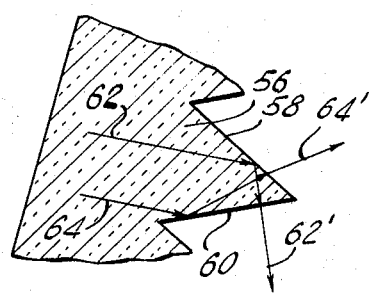
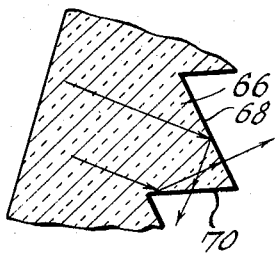
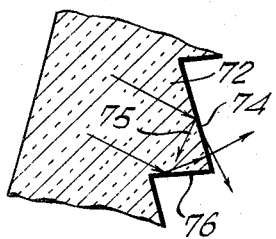
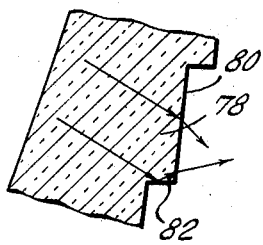
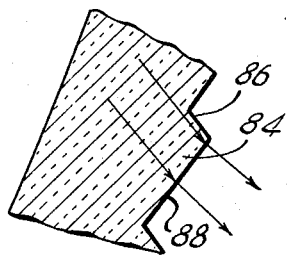
INVENTOR.
HERBERT A. ODLE
BY
Nolte & Nolte
ATTORNEYS

INVENTOR.
HERBERT A. ODLE

United States Patent Office 3,249,752
Patented May 3, 1966

3,249,752
GLARE REDUCING REFRACTOR
Herbert A. Odle, Newark, Ohio, assignor to Holophane Company, Inc., New York, N.Y., a corporation of Delaware
Filed Oct. 24, 1963, Ser. No. 318,710
7 Claims. (Cl. 240—106)

The present invention relates to refractors which direct light from a light source in useful directions for the purpose of illuminating areas in predetermined patterns. More particularly, the invention relates to prismatic formations on the walls of such refractors for reducing glare.

The refractor of the invention may be used in a luminaire which is ceiling mounted, for instance, for lighting interior corridors or outdoor canopies. The refractor may also be wall mounted and used for various outdoor applications, e.g. adjacent doors and the like, or along low buildings for perimeter lighting.

In prior art refractors, of the type described, the sides and ends have been provided with horizontal light splitting prisms, such as are described in United States Patent No. 2,814,723. It was determined, however, that more "up-light" from these areas was required than could be delivered by these splitting prisms.

Therefore, and in accordance with the invention, the uppermost horizontal light splitting prisms on such refractors have been eliminated in favor of prisms which effect a wider divergence of the "up-light." Further, in accordance with the invention, the refractor side prism formations are arranged to provide a gradual and substantially unnoticeable transition from both reflecting and refracting prisms on the top of the refractor, to refracting prisms only, positioned lower on the sides. In this manner, all of the light which had, in prior art devices, been directed through the side of the refractor upwardly at fairly high angles in order to prevent glare, is more efficiently distributed at wider angles, upwardly at the top of the luminaire, to gradually lower vertical angles and finally, into increasingly narrower, downwardly directed angles toward the lower portion of the upper part of the refractor sides. Thus, a greater amount of light is sent upwardly to prevent glare, while the total amount of the light through the sides of the refractor is utilized by the present invention for greater efficiency in the illumination pattern of the refractor.

The invention will best be understood upon reading the following detailed description of a specific embodiment thereof, when taken in conjunction with the accompanying drawings, in which:

FIG. 5 is a schematic cross-sectional view of the refractor of FIGS. 1–4, showing only the exterior sidewall prisms thereof;

FIG. 6 is a schematic, enlarged cross-sectional view of the area bounded by the circle VI in FIG. 5;

FIG. 7 is a cross-sectional view showing of a prior art prism construction which is replaced in the present invention by the prism construction of FIG. 6;

FIGS. 8–12 are enlarged schematic cross-sectional views of the prisms bounded by the circles VIII–XII, in FIG. 5;

Figure 1:
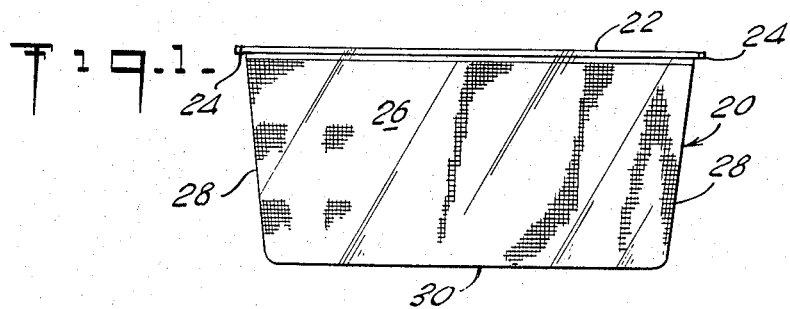
FIG. 1 is a side elevational view of a refractor according to the invention.
Figure 2:
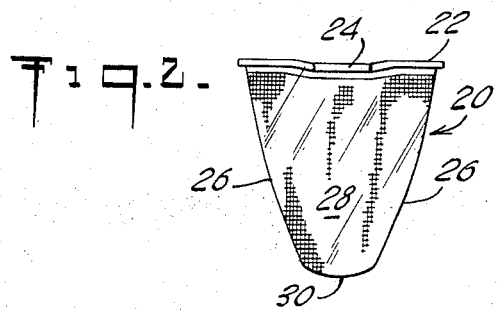
FIG. 2 is an end elevational view of the refractor shown in FIG. 1.
Figure 3:
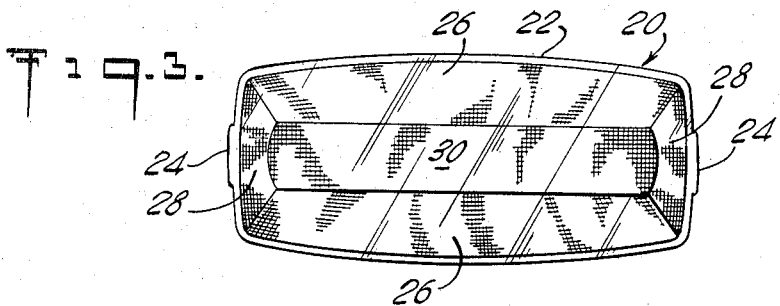
FIG. 3 is a bottom view thereof.
Figure 4:
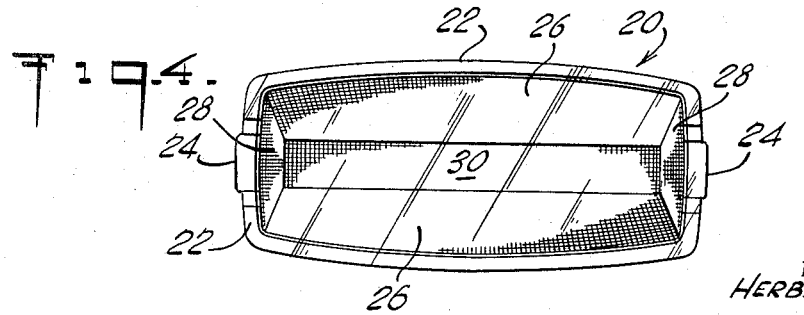
FIG. 4 is a top view of the refractor.

In FIGS. 1–3 a refractor 20 is shown provided at its upper extremity with a mounting flange 22 peripherally surrounding the extremity of the refractor 20. Oppositely disposed mounting lugs 24 are provided on each end of the mounting flange for purposes of preferential mounting. The bulk of the refractor 20, disposed below and integral with the mounting flange 22 includes two generally rectangular sides 26, two opposing end portions 28 and a bottom portion 30.

In the schematic showing of FIG. 5 a sidewall 26 is shown in cross-section having a plurality of prisms on the exterior side thereof, the formations on the interior walls being omitted for clarity. A light source 29 is disposed within the refractor, the outside prisms on the refractor 20 serving to direct the light emitted by the source in the desired directions in a manner to be explained.

Figure 13:
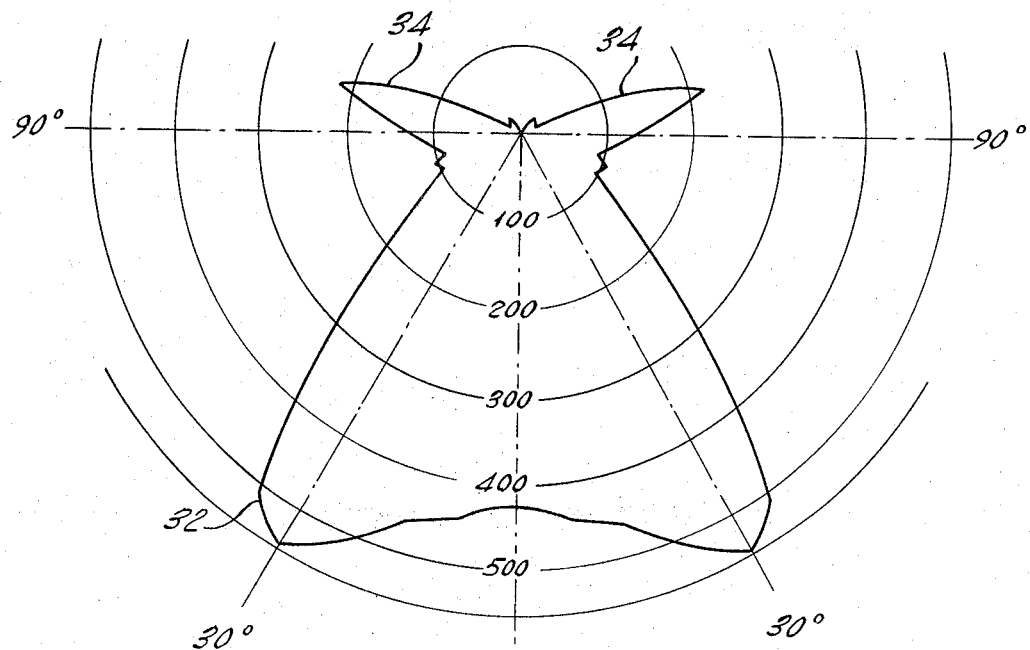
FIG. 13 shows the vertical light distribution in a plane transverse to the longitudinal axis of the refractor utilizing a 120 volt, 150 watt light bulb within a refractor of the invention, the test distance being 10 feet.

The particular lighting requirements to be fulfilled by the illustrated embodiment of the invention are shown by the curve 32 of FIG. 13, indicating the desired concentration of light between a thirty and forty degree vertical angle, the so-called utilization zone, with decreased emission at a zero degree vertical angle. A certain amount of "up-light," indicated by the upper lobes 34 of the curve 32, is desired to illuminate the surface adjacent the refractor 20, usually the mounting surface of the luminaire. As can be seen from curve 32, when viewing from directly underneath, or zero degree vertical, and also when viewing from angles between sixty and ninety degrees vertical, the brightness is to be at a minimum, to prevent the exit of a substantial amount of the light emitted by source 29. These angles represent the angles from which an observer is most likely to have a view of the reflector, i.e. the so-called glare zone.

The uppermost prisms of the refractor 20 are of the conventional once reflecting, once-refracting type as exemplified by the prism 36 in FIG. 6. The operation of such prisms may be understood with reference to FIG. 7, wherein a light ray 40 emitted from the light source 29 impinges upon an upper surface 42 of the prism, is reflected therefrom in a direction indicated by the arrow 40', and emitted through the lower surface 44 of the prism. A light ray 46 impinging upon the lower surface 44 is reflected therefrom in the direction indicated by the arrow 46', and refracted upon exit from the upper surface 42 in a direction indicated by the arrow 46".

The prism 36 of FIG. 6, as distinguished from the prior art prism 38, consists of an upper surface 48 and a lower surface 50, plus a third surface 52, which is adapted to refract a light ray 54 impinging thereupon in an upward direction indicated by the arrow 54. As illustrated, the novel prisms of FIG. 6 may be formed by simply filling in portions of the "valleys" between adjacent prisms of FIG. 7. By means of the third, additional surface 52, more up-light can be realized than with the prior art light-spreading prisms such as prism 38 to thus obtain illumination directed at very high angles as shown by lobes 34 of curve 32 in FIG. 13.

As mentioned above, the type and orientation of the prisms disposed on the surface of the refractor gradually changes from top to bottom. Thus, the nine uppermost prisms may be constructed as illustrated in FIG. 6.

The prisms disposed below these topmost prisms are formed so that a gradual transition, which is unnoticeable by the untrained eye, occurs from one prism to another, resulting in a transition from once-reflecting, once-refracting prisms to a refracting-only type of prism disposed on the lower sides of the refractor. FIG. 8 illustrates the tenth prism from the top, shown at 56. A light ray 62 impinging upon the top surface 58 of prism 56 is reflected internally and passes from the refractor in a downward direction, as indicated by the arrow 62. A light ray 64, impinging upon the lower surface 60 of the prism 56 is reflected upwardly and outwardly in the direction indicated by the arrow 64. In FIG. 9, a prism 66 represents the fifteenth prism on the refractor 20 and is similar to tenth prism 56. Light rays are reflected by the upper and lower surfaces 68 and 70, respectively, of the prism and subsequently pass through the opposite sides. In the seventeenth prism 72, shown in FIG. 10, the inclination of the upper side 74 is closer to the vertical, while the lower side 76 is closer to the horizontal than in the preceding prisms. Furthermore, since these prisms are on a lower portion of the refractor, the light from source 29 arrives at the upper surface 74 at such an angle that it is refracted through this surface rather than being reflected therefrom as in the case of the preceding prisms. Prism 72 is at a transitional point wherein the prisms become different in character than the preceding prisms, and arrow 75 represents a small spurious reflection which may still occur at this point from upper face 74. In the twentieth prism 78, shown in FIG. 11, a further transition of the angle of inclination of the upper face 80 relative to the vertical is shown, but the lower face 82 still retains its reflecting characteristics.

The lowermost prisms of the luminaire are represented in FIG. 12 by a prism 84, which specifically illustrates the twenty eighth prism on refractor 20. These lower prisms have similar characteristics requiring a continuous transition of the angular disposition of the prism faces, so that the upper surfaces 86 will not intercept any light, while the lower surfaces 88 refract the light intercepted thereby in a light elevating manner.

As shown in FIG. 5, a plurality of flutes 90 are disposed between the twenty second and twenty eighth prisms on the refractor. The vertical angle at which this area of the refractor intercepts the light, corresponds to the thirty degree maximum vertical angle illustrated in FIG. 13; therefore, no redirecting of the light from this direction is desired. The flutes 90 exert merely a spreading action upon the light and help to conceal the light source. The upper surfaces of the prisms disposed above the flutes 90 direct the light into downward directions to produce a maximum illumination intensity throughout the desired range. Similarly, the lower surface of the prisms disposed below flutes 90 elevate the light into this range.

On the ends 28 of the refractor 20, the prisms (not shown) may be constructed in accordance with the prior art, such as shown in U.S. Patent No. 2,814,723, or in accordance with the prismatic distribution according to the present invention, depending upon the desired vertical light distribution in the logitudinal plane.

Figure 14:
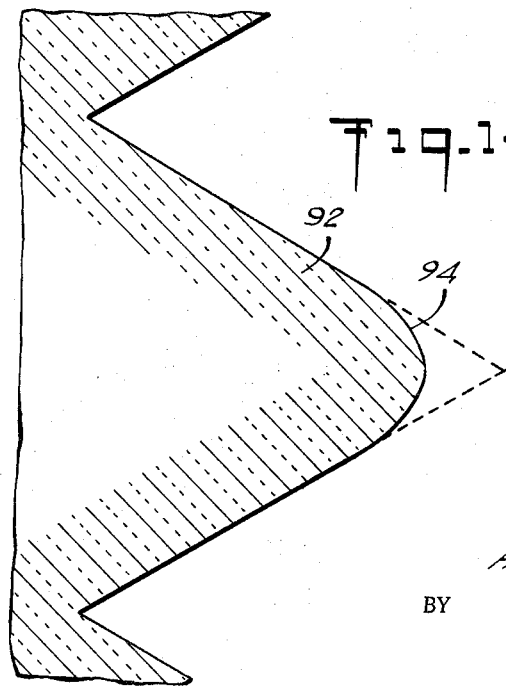
FIG. 14 is a fragmentary, cross-sectional view of a prism disposed on the interior sidewalls of the refractor.

On the inner surfaces of sides 26, V-shaped prisms 92 (FIG. 14) may be employed to obscure light source 29. Prisms 92 may have a rounded tip 94 to make the refractor as luminous as possible. On the inner surface of the ends, to accomplish absolute fixture concealment and brightness minimization at normal viewing angles, the prisms are V-shaped without a rounded tip.

By means of the transitional nature of the prisms, gradual transition is provided from each prism to the adjacent one, which would not be noticed by an untrained observer, thereby creating the impression of a surface uniformly covered with identical-looking prisms. However, the orientation of the prisms provides the desired vertical light distribution characteristics of FIG. 13. The light distribution, therefore, is more efficient with a prismatic arrangement according to the present invention to concentrate light in non-glare producing, utilization directions. Thus, light which had previously been sent into upward directions to prevent and eliminate glare, is now brought into more useful angles for corridor lighting and related applications.

What is claimed is:

1. A refractor for concentrating an emission of light within the refractor between pre-selected vertical angles, comprising a plurality of horizontal prisms disposed in a mutually parallel relationship on a side of the refractor, said prisms having first surfaces and second surfaces, each first surface of each prism comprising means for intercepting light at a smaller angle than the first surface of a subsequent lower prism, and each second surface of each prism comprising means for intercepting light at a larger angle than the second surface of a subsequent lower prism, said prisms thereby forming once-reflecting, once-refracting prisms on the upper part of said refractor, refracting-only prisms on the lower part of said refractor, and transitional prisms on the intermediate part of said refractor, said surfaces of said transitional prisms further comprising means for once-reflecting, once-refracting light incident on the second surfaces thereof and for once-refracting only light incident on said first surfaces thereof, and a plurality of flutes between said transitional prisms said refracting-only prisms on the lower part of said refractor.

2. In a refractor which includes means for receiving a radiant emission of light and transmitting the same between pre-selected angles, said receiving and transmitting means comprising an end and a sidewall extending therefrom a plurality of linearly extending prisms disposed in side by side relationship and extending substantially along planes parallel to said end and covering a substantial portion of said sidewall from said end to portions remote therefrom, said prisms adjacent said remote portion comprising first prisms having means for only refracting light incident thereon, said prisms toward said end comprising second prism having means for once reflecting once-refracting light incident thereon, the improvement comprising transitional prisms intermediate said first and second prisms and including first surfaces each comprising means for intercepting light at a smaller angle than the first surface of a next subsequent transitional prism more remote from said end and second surfaces each comprising means for intercepting light at a larger angle than the second surface of a next subsequent transitional prism more remote from said end, said transitional prisms gradually changing from those nearer said end toward those nearer said remote portion from means for reflecting and refracting light incident on said first and second surfaces to means for reflecting and refracting light incident on said second surfaces and for only refracting light incident on said first surfaces.

3. In the refractor of claim 2 wherein flutes are disposed intermediate said transitional prisms and said first prisms for diffusing light incident thereon without effecting a change in the general direction thereof.

4. The refractor of claim 2 wherein said receiving and transmitting means constitute means for receiving the radiant emission of light in planes transverse to said sidewall, and from a source disposed intermediate said end and said remote portions, and wherein said first prisms having means for only refracting light incident thereon in directions away from said end.

5. In the refractor of claim 4 wherein said second prisms include separating surfaces therebetween and said separating surfaces comprise means for refracting light incident thereon in directions toward said end.

6. In the refractor of claim 5 wherein said prisms are disposed in horizontal planes and said directions toward and away from said end are respectively upwardly and downwardly at vertical angles relative to nadir.

7. In the refractor of claim 2, wherein said prisms are disposed in horizontal planes and said surfaces of said transitional prisms vary in their inclination to the vertical from each prism to the next adjacent prism.

References Cited by the Examiner

UNITED STATES PATENTS

| | | | |
|---|---|---|---|
| 1,426,280 | 8/1922 | Dorey | 240—106 X |
| 1,644,915 | 10/1927 | Dorey | 240—106 |
| 2,551,954 | 5/1951 | Lehman | 240—106.1 X |

OTHER REFERENCES

Jolley, Waltram, and Wilson: Theory and Design of Illuminating, Engineering Equipment, John Wiley and Sons, 1931 (pages 297–317).

NORTON ANSHER, *Primary Examiner.*

C. R. RHODES, *Assistant Examiner.*